(12) United States Patent
Xi et al.

(10) Patent No.: US 11,660,687 B2
(45) Date of Patent: May 30, 2023

(54) KEY DUPLICATING MACHINE'S CLAMP BENCH AND KEY DUPLICATING MACHINE

(71) Applicant: Shenzhen Xhorse Electronics Co., Ltd., Shenzhen (CN)

(72) Inventors: Yongfeng Xi, Shenzhen (CN); Yuan He, Shenzhen (CN); Yijie Hao, Weifang (CN); Chenglong Li, Shenzhen (CN); Guozhong Cao, Shenzhen (CN)

(73) Assignee: SHENZHEN XHORSE ELECTRONICS CO., LTD, Shenzhen (CN)

( * ) Notice: Subject to any disclaimer, the term of this patent is extended or adjusted under 35 U.S.C. 154(b) by 657 days.

(21) Appl. No.: 16/776,308

(22) Filed: Jan. 29, 2020

(65) Prior Publication Data
US 2020/0238401 A1    Jul. 30, 2020

(30) Foreign Application Priority Data
Jan. 29, 2019   (CN) .......................... 201910088242.3

(51) Int. Cl.
*B23C 3/35*    (2006.01)
*B23Q 3/06*    (2006.01)

(52) U.S. Cl.
CPC .............. *B23C 3/355* (2013.01); *B23Q 3/061* (2013.01); *B23Q 3/062* (2013.01); *B23C 2270/08* (2013.01)

(58) Field of Classification Search
CPC . B23Q 3/00; B23Q 3/06; B23Q 3/061; B23Q 3/062; B23Q 3/067; B23Q 3/102; B23Q 3/355; B23C 2270/08
USPC ........ 269/43, 45, 71, 73, 246, 291, 309, 310
See application file for complete search history.

(56) References Cited

U.S. PATENT DOCUMENTS

| 2002/0182022 | A1 | 12/2002 | Chies et al. | |
|---|---|---|---|---|
| 2006/0093451 | A1* | 5/2006 | Wu .......................... | B23C 3/355 409/219 |
| 2012/0141221 | A1* | 6/2012 | Wu .......................... | B23C 3/35 409/81 |

FOREIGN PATENT DOCUMENTS

| AU | 658094 B1 | * | 3/1995 | ............... B23C 3/35 |
|---|---|---|---|---|
| CN | 107186512 A | * | 9/2017 | ............... B23C 3/35 |
| WO | 2005039810 A1 | | 5/2005 | |

OTHER PUBLICATIONS

CN-107186512—Machine Translation (Year: 2017).*

* cited by examiner

*Primary Examiner* — Monica S Carter
*Assistant Examiner* — Alberto Saenz
(74) *Attorney, Agent, or Firm* — Myers Wolin LLC

(57) ABSTRACT

A clamp bench for key duplicating machines, comprising a fixed component, a first rotary component, a second rotary component and a slide base; the fixed component comprises a first fixed component and a second fixed component, the first fixed component is used to hold the master key in place and the second fixed component is used to hold the key blank in place; the first rotary component, the first fixed component and the second fixed component are rigidly connected to the first plane of the first rotary component, the second rotary component forms a rotary connection with the second plane of the first rotary component. Using the clamp bench, the user can press and rotate the handle with one hand to perform composite rotary feeding of the duplicated key along two different axial lines around the rotary axis and the slide base, completing the processing of the key with bevel tooth.

14 Claims, 5 Drawing Sheets

1205  1207  1206

1209  1210

KEY DUPLICATING MACHINE'S CLAMP BENCH AND KEY DUPLICATING MACHINE

CROSS REFERENCES TO RELATED APPLICATIONS

This application claims the benefit of the Chinese Patent Application No. CN201910088242.3, filed on Jan. 29, 2019. The disclosure and entire teachings of the Chinese Patent Application No. CN201910088242.3 are hereby incorporated by reference.

FIELD OF THE INVENTION

The present solution is directed toward the field of key duplicating equipment, particularly a clamp bench for key duplicating machines.

BACKGROUND OF THE INVENTION

In the field of key duplicating machines, when a horizontal milling key duplicating machine is used to process a slot key with bevel tooth, the original key must touch the guide pin sheet, with the key blank and the cutter over a greater chamfer so that the machine can fully process the key shape to perform normal unlocking. For an ordinary horizontal milling key duplicating machine used to process an edge cut key, the contacting chamfer is between the key and the guide pin sheet or the cutter, because at the time of axial feeding, the key and the bench will rotate along a single axial line in relation to the key duplicating machine, which will make it impossible to change the angle of contact between the key and the cutter and duplicate the slot key with the bevel teeth.

To process the slot key with bevel tooth, the known technologies add a rotary shaft and a clutch buckle to the key duplicating machine bench to add a space for relative motion between the clamp installation plate and the bench. The user can pull the handle on the side of the clamp installation plate up and down to rotate the plate in relation to the bench, or pull the bench up and down to rotate the bench in relation to the horizontal miller. The user can hold the handle of the clamp installation plate and the bench with two hands respectively to achieve a simultaneous composite motion of the clamp installation plate around two axes, thereby increasing the angle of contact between the key and the cutter, in order to process the bevel key.

However, this method also has a disadvantage: when working, the user will have to hold the bench and the installation plate with two hands respectively to ensure stable tooth feeding during key processing, while for the axial feeding of the key, the user will have to release the bench or installation plate with one hand after processing one tooth and use the free hand to complete the axial feeding, or ask another person to help complete the work. This means that the user cannot simultaneously complete the horizontal and axial feeding, so this method is less convenient and lacks continuity.

Patent application US2002182022A1 describes an improved clamp for key duplicating machines, comprising a pair of jaws able to approach each other and define at least one seat for clamping a key, and a gauge associable with said seat to define a correct position of said key, wherein with said gauge there is slidingly associated a counteracting element which interferes with said seat when said gauge is in its operating condition and forms a support for a tip of said key housed in said seat.

Patent application US2020001378A1 describes a clamp for a key making machine, comprising: an anvil; a plate-like door movable toward the anvil to sandwich a key blank therebetween; an inwardly extending mounting shelf located at a stem-end of the T-shaped recess, between an upper end and the lower end; a gate pivotally connected to the door and including a T-shaped frame supported within the T-shaped recess, and a piston extending inward from the gate and configured to engage the key blank; a clevis connected to the door and a pin passing through the gate and the clevis. The door includes a T-shaped recess formed at a lower end adjacent the anvil and the clevis includes a mounting plate connected to the inwardly extending mounting shelf and spaced-apart tabs configured to receive a corresponding portion of the gate therebetween.

Patent application WO2005039810A1 describes an improved clamp for a key duplicating machine comprising a threaded vertical pin rigid with a carriage and engaged in two jaws retained by a knob (14), characterized by comprising, on a flat jaw face, a counteracting member (22) the distance of which from the jaw hole axis can be adjusted to always maintain the jaw contacting surface parallel to itself.

SUMMARY

The present solution provides a clamp bench for key duplicating machines in order to resolve the lack of continuity and multiple operations required during horizontal feeding during key processing.

This disclosure provides a clamp bench for key duplicating machines, which comprises a fixed component, a first rotary component, a second rotary component and a slide base. The fixed component comprises a first fixed component and a second fixed component: the first fixed component is used to hold the master key in place and the second fixed component is used to hold the key blank in place. The first rotary component, the first fixed component and the second fixed component are rigidly connected to the first plane of the first rotary component, the second rotary component forms a rotary connection with the second plane of the first rotary component, and the second plane and the first plane are opposite to one another. The first rotary component rotates in the axial direction around the connecting point with the second rotary component. The slide base forms a rotary connection with the second rotary component, the second rotary component rotates in the axial direction around the connecting point with the slide base; the axial direction in which the second rotary component rotates is the same as that of the first rotary component, and the second rotary component slides along the slide base.

Further, the first fixed component and the second fixed component comprise an upper clamp, a lower clamp and a locking mechanism respectively: the upper clamp and the lower clamp are opposite to one another, the lower clamp is rigidly connected to the first plane of the first rotary component, and the locking mechanism is rigidly connected to the upper clamp and the lower clamp. The locking mechanism is used to control the opening and closing of the upper clamp and the lower clamp.

Further, the second plane of the first rotary component is fitted with a rotary axis; the said first rotary component rotates in the axial direction around the rotary axis. The second rotary component is provided with a first through hole, with an inner diameter which is the same as the diameter of the rotary axis, and the rotary axis passes through the first through hole and rotates inside it.

Further, fitted between the first rotary component and the second rotary component is a control mechanism, which comprises a cylindrical pin, a control base and a control axis; the cylindrical pin and the control base form a rotary connection, and one end of the control axis and the control base form a rotary connection. The cylindrical pin and the second plane of the first rotary component form a fixed connection, and the other end of the control axis forms a rotary connection with the second rotary component. The control axis is used to control the movement of the said control base and further drive the axial rotation of the first rotary component around the rotary axis.

Further, the control base is a cross slide block which is provided with a second through hole and a third through hole. The axial directions of the second through hole and the third through hole are perpendicular to one another and are not on the same plane; the axial direction of the second through hole is parallel to that of the rotary axis. The first rotary component is fitted with a horizontal axial base, and both ends of the horizontal axial base are provided with concentric via holes, that is, a first via hole and a second via hole respectively. The cylindrical pin passes through the first via hole, the second through hole and the second via hole in turn to form a rotary connection between the horizontal axial base and the cross slide block, and the cross slide block slides on the cylindrical pin.

Further, the control axis is a crank lever, which comprises a crank short axis, a crank arm and a crank long axis: the crank short axis and the crank long axis are connected to both ends of the crank arm and are both perpendicular to the crank arm, the end of the crank short axis and that of the crank long axis are opposite in direction, and the crank short axis is inserted into the third through hole.

Further, the second rotary component is fitted with a U groove: the cross slide block is arranged in the U groove, and rotates in the U groove along the axial direction of the third through hole.

Further, the second rotary component is fitted with a crank axial base, the crank axial base is provided with an axis base hole and the crank long axis passes through the axis base hole.

Further, the bottom of the second rotary component is provided with a fourth through hole, and the slide base is cylindrical and passes through the fourth through hole.

Further, the second rotary component also comprises a handle, which is fitted outside the crank long axis.

Further, the fixed component and the first rotary component jointly constitute a clamping mechanism, the clamping mechanism comprises the first rotary component as the base, a spindle, a first clamping jaws, a flexible element, a second clamping jaws, a thrust bearing and a rotary knob; the first rotary component is fitted with a first embedding structure and an installation hole, one end of the spindle is fitted with an inner thread structure, the installation hole crossing the first rotary component is rigidly connected to the first rotary component via thread connection, and the other end of the spindle is fitted with an external thread structure.

Further, two sides of the first clamping jaws are fitted with a second embedding structure and a third embedding structure respectively, the third embedding structure is fitted with a counterbore, the spindle crosses the counterbore, the second embedding structure is embedded with the first embedding structure, the second clamping jaws are provided with a through hole and a fourth embedding structure, the second clamping jaws cross the spindle via the through hole, and the fourth embedding structure is embedded with the third embedding structure; the flexible element is arranged around the spindle, the lower end of the flexible element pushes against the counterbore of the first clamping jaws, and the upper end of the flexible element pushes against the through hole of the second clamping jaws, the thrust bearing is arranged around the spindle, the bottom of the thrust bearing pushes against the second clamping jaws, and the top pushes against the rotary knob, one end of the rotary knob is the handle structure, the other end is provided with the thread hole, and the rotary knob forms a thread connection with the external thread structure of the spindle through the thread hole.

Further, the first embedding structure is a cross groove, and the installation hole is a round through hole, the counterbore is opposite to the thread hole; the second embedding structure and the third embedding structure are both square concave blocks; the fourth embedding structure is a square groove, the flexible element is a return spring with a restoring force that will keep the first clamping jaws and the second clamping jaws away from one another.

This solution also discloses a key duplicating machine, and the said key duplicating machine comprises the aforesaid clamp bench.

Further, the key duplicating machine also comprises a guiding base mechanism, the guide base mechanism comprises a guide base foundation, a guide base axis, a milling cutter guide sheet, a regulating nut, a cushion, a flexible element, an end cover and a horizontal regulating bolt; the guide base foundation is provided with a centre hole; inside the centre hole is the guide base axis; the milling cutter guide sheet is rigidly connected to the head part of the guide base axis via a thread fastener; the middle part of the guide base axis is fitted with an external thread, the regulating nut is fitted with an internal thread that matches the external thread, and is fastened on the guide base axis via the thread; the cushion is arranged around the guide base axis and fixed between the front-end surface of the guide base foundation and the regulating nut, the flexible element is arranged between the guide base foundation and the guide base axis, the end cover is installed in the hole tail part of the guide base foundation via a thread fastener and attached to the guide base foundation, the horizontal function of the guide base foundation is provided with a thread hole, and the regulating nut is installed on the thread hole, the horizontal regulating bolt is fitted with a round sheet, which is embedded in the groove at the base of the key duplicating machine.

Further, the tail of the guide base foundation is a waist-like round concave platform, and inside the guide base foundation is a waist-like stair hole that matches the platform.

Further, the cushion is made of copper or an abrasion-resistant plastic material, and the external surface of the regulating nut is carved with scales.

Benefits of this solution are: when using the clamp bench of the key duplicating machine under this solution to process a key, the user can press and rotate the handle with one hand to perform composite rotary feeding of the duplicated key along two different axial lines around the rotary axis and the slide base, thereby completing the processing of the key with bevel tooth. At the same time, the feeding along the axial line of the duplicated key can be simultaneously performed, thereby enhancing the stability, convenience and continuity of processing. Moreover, the user can tighten the non-fall locking nut to perform single rotary feeding of the duplicated key in the axial direction in relation to the slide base, thereby completing the processing of ordinary keys with straight tooth, ensuring universality.

Other features and advantages of the present solution will be apparent from the following more detailed description, taken in conjunction with the accompanying drawings which illustrate, by way of example, the principles of the solution.

Figure 1:
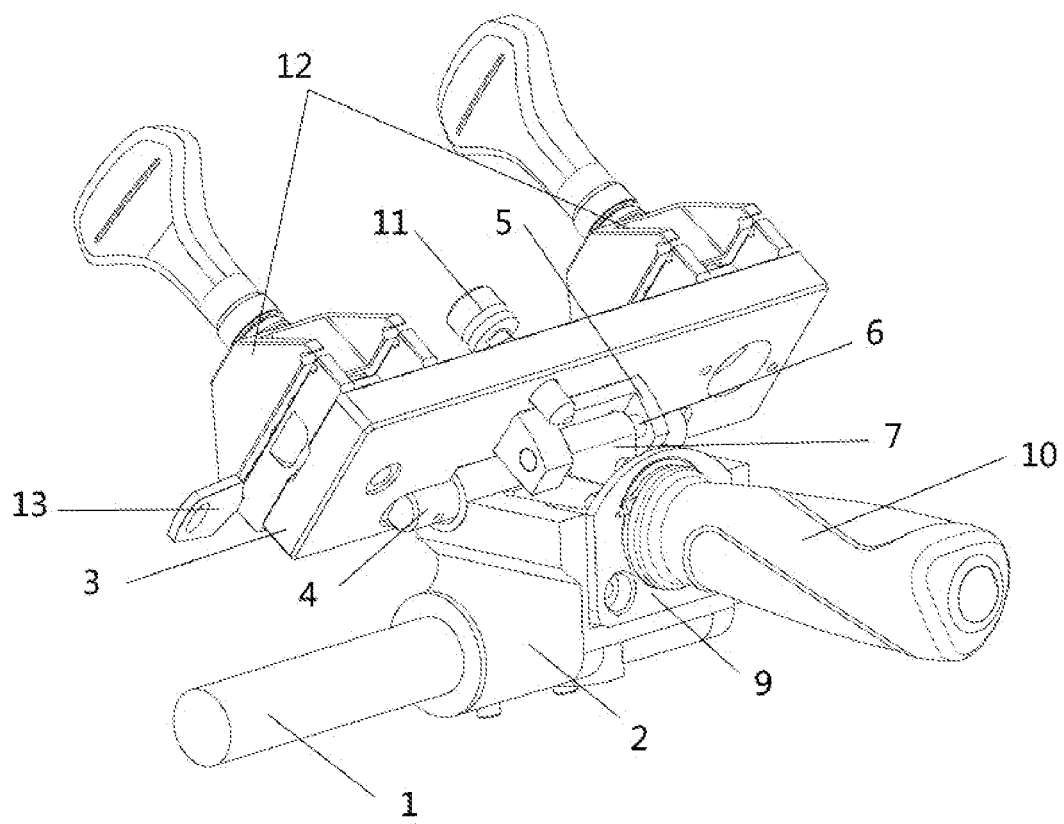
FIG. 1 is a schematic diagram for the structure of a preferred embodiment of the clamp bench for a key duplicating machine under this disclosure.

The purpose realization, functional characteristics and advantages of this solution will be further described with the preferred embodiment and the attached drawings.

DETAILED DESCRIPTION OF THE PREFERRED EMBODIMENTS

The description of illustrative embodiments according to principles of the present disclosure is intended to be read in connection with the accompanying drawings, which are to be considered part of the entire written description. In the description of embodiments of the disclosure disclosed herein, any reference to direction or orientation is merely intended for convenience of description and is not intended in any way to limit the scope of the present disclosure. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the disclosure are illustrated by reference to the exemplified embodiments. Accordingly, the disclosure expressly should not be limited to such exemplary embodiments illustrating some possible non-limiting combination of features that may exist alone or in other combinations of features; the scope of the disclosure being defined by the claims appended hereto.

This disclosure describes the best mode or modes of practicing the disclosure as presently contemplated. This description is not intended to be understood in a limiting sense but provides an example of the disclosure presented solely for illustrative purposes by reference to the accompanying drawings to advise one of ordinary skill in the art of the advantages and construction of the disclosure. In the various views of the drawings, like reference characters designate like or similar parts.

It is important to note that the embodiments disclosed are only examples of the many advantageous uses of the innovative teachings herein. In general, statements made in the specification of the present application do not necessarily limit any of the various claimed disclosures. Moreover, some statements may apply to some inventive features but not to others. In general, unless otherwise indicated, singular elements may be in plural and vice versa with no loss of generality.

Technical staff in the technical fields can understand that unless otherwise specified, the singular forms like "one", "said" and "such" used herein can also include their respective plural forms. It should be further understood that the expression "include" used in this solution specification means there are said characteristics, integer numbers, steps, operations, elements and/components, but it is not ruled out that one or more other characteristics, integer numbers, steps, operations, elements, components and/or their assemblies may exist or be added.

Technical staff in the technical fields can understand that, unless otherwise specified, all terms (including technical terms and scientific terms) used herein shall have the same meanings that ordinary technical staff in the fields of this solution generally understand. It should also be noted that those terms defined in the general dictionary shall be understood as having the meanings that are in use in the context of the existing technology, and they will not be interpreted with ideal or very formal meanings, unless otherwise specifically defined herein.

Figure 2:
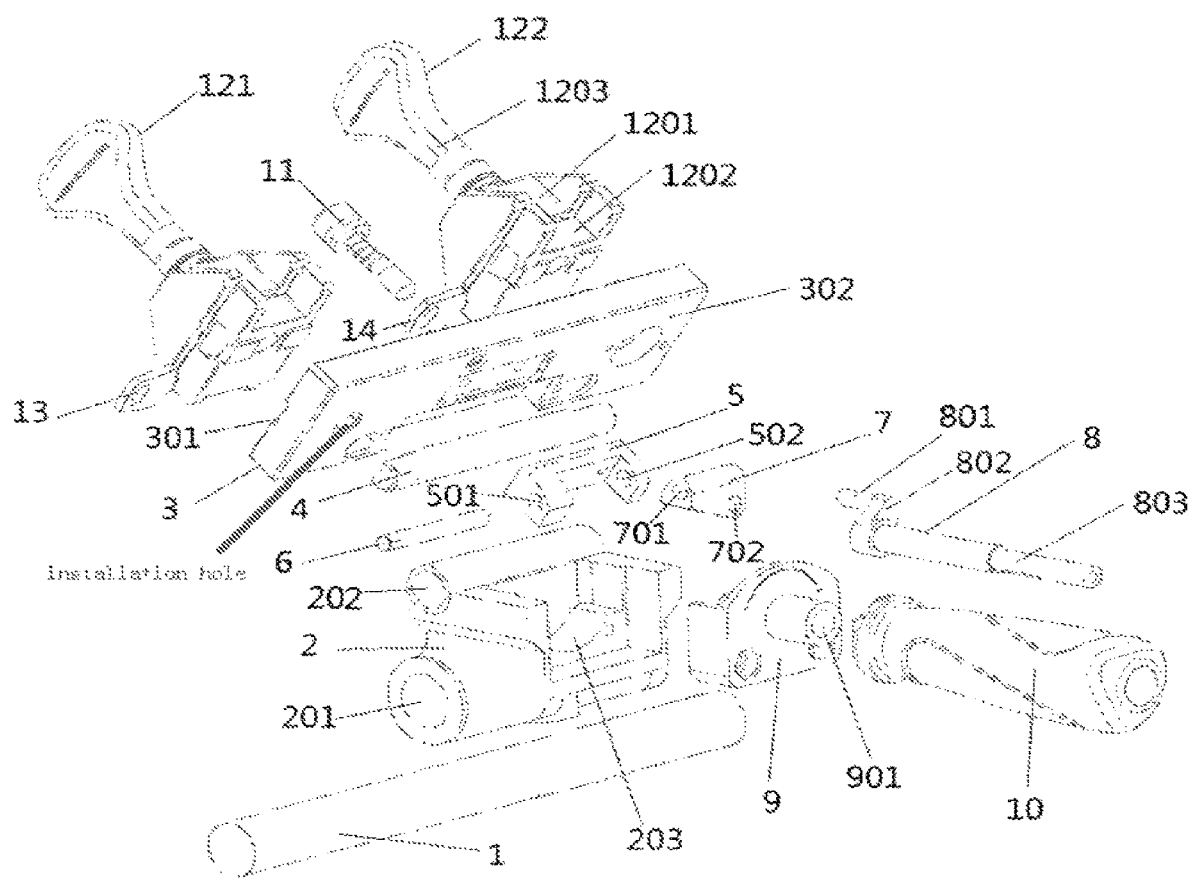
FIG. 2 is the exploded-view schematic diagram for the structure of a preferred embodiment of the clamp bench for a key duplicating machine under this solution.
Figure 3:
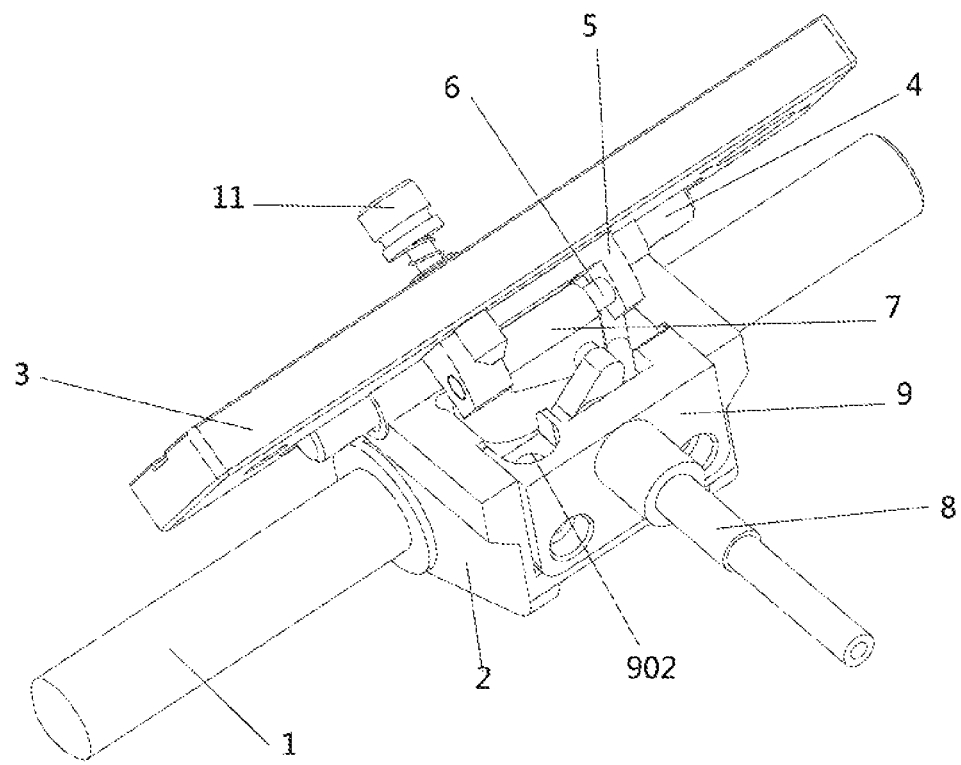
FIG. 3 is the schematic diagram for the structures of the first rotary component, the second rotary component, the control mechanism and the slide base in a preferred embodiment of the clamp bench for a key duplicating machine under this solution.

As illustrated, FIG. 1 to FIG. 3 render a preferred embodiment of a clamp bench for key duplicating machines, which comprises a fixed component 12, a first rotary component 3, a second rotary component 2 and a slide base 1. The fixed component 12 comprises a first fixed component 121 and a second fixed component 122; the first fixed component 121 and the second fixed component 122 are in parallel and opposite to one another. The first rotary component 3, the first fixed component 121 and the second fixed component 122 are rigidly connected to the first plane 301 of the first rotary component 3, the first rotary component 3, the first fixed component 121 and the second fixed component 122 are rigidly connected to the first plane 301 of the first rotary component 3, the second rotary component 2 forms a rotary connection with the second plane 302 of the first rotary component 3, and the second plane 302 and the first plane 301 are opposite to one another. The first rotary component 3 rotates in the axial direction around the connecting point with the second rotary component 2. The slide base 1 forms a rotary connection with the second rotary component 2, the second rotary component 2 rotates in the axial direction around the connecting point with the slide base 1, the axial direction in which the second rotary component 2 rotates is the same as that of the first rotary component 3, and the said second rotary component 2 slides along the slide base 1. In this preferred embodiment, the master key 13 is the original key, the key blank is the duplicated key, and the clamp bench of the key duplicating machine is opposite to the key processing bench. To process the slot key with bevel tooth, the clamp bench of the key duplicating machine is equipped with the first rotary component 3 and the second rotary component 2 so that the fixed component 12 clamping the key can simultaneously rotate along two different axial lines in relation to the second rotary component 2 and the slide base 1. The user can rotate the first rotary component 3 and the second rotary component 2 to increase the angle of contact of the master key 13 and the key blank 14 with the cutter on the bench, thereby processing the key with bevel tooth. In addition, the fixed component 12 can slide left and right in relation to the slide base 1, meaning that the fixed component 12 can freely slide in relation to the bench position. After processing one tooth, the user can slide left and right to align other teeth for processing. This will allow the user only to operate horizontal and axial feeding, increasing convenience and improving continuity.

The first fixed component 121 and the second fixed component 122 comprise an upper clamp 1201, a lower clamp 1202 and a locking mechanism 1203 respectively: the said upper clamp 1201 and the said lower clamp 1202 are opposite to one another, the lower clamp 1202 is rigidly connected to the first plane 301 of the first rotary component 3, and the locking mechanism 1203 is rigidly connected to the upper clamp 1201 and the lower clamp 1202. The locking mechanism 1203 is used to control the opening and closing of the upper clamp 1201 and the lower clamp 1202. The said master key 13 is placed between the said upper clamp 1201 and the said lower clamp 1202 of the said first fixed component 121, and the said key blank 14 is placed between the said upper clamp 1201 and the said lower clamp 1202 of the said second fixed component 122. The said upper clamp 1201 and the said lower clamp 1202 are both provided with a pin hole, and the pin hole on the said upper clamp 1201 is opposite to that on the lower clamp 1202. The said locking mechanism 1203 passes through the pin hole of the said clamp and that of the said lower clamp 1202 to lock the said upper clamp 1201 and the said lower clamp 1202, and hold the said master key 13 and the said key blank 14 in place with the said first fixed component 121 and the said second fixed component 122 respectively. In this preferred embodiment, the clamp bench of the key duplicating machine is opposite to the key processing bench. When a key is duplicated, the original key and the duplicated key will be held in place by the first fixed component 121 and the second fixed component 122 respectively and locked to prevent displacement during the duplicating process. In some other preferred embodiments, there may be a plurality of duplicated keys such as two, three, or four, and accordingly, the number of second fixed components 122 will match the number of duplicated keys, so every duplicated key is held in place by one second fixed component 122 to simultaneously duplicate a plurality of keys.

The second plane 302 of the first rotary component 3 is fitted with a rotary axis 4; the first rotary component 3 rotates in the axial direction around the rotary axis 4. The said second rotary component 2 is provided with a first through hole 202, with an inner diameter which is the same as the diameter of the rotary axis 4; the said rotary axis 4 passes through the said first through hole 202 and rotates inside it. In this preferred embodiment, the rotary axis 4 is semi-cylindrical. One side of the plane is rigidly connected to the first rotary component 3. The first through hole 202 is arranged around the middle of the rotary axis 4, so the rotary axis 4 can rotate along the inner wall of the first through hole 202 and further drive the first rotary component 3 to rotate in the axial direction. In some other preferred embodiments, the rotary axis 4 is cylindrical, both ends of the axis are rigidly connected to the first rotary component 3, and the first through hole 202 is arranged around the middle of the rotary axis 4, so the rotary axis 4 can rotate along the inner wall of the first through hole 202 and further drive the first rotary component 3 to rotate in the axial direction.

Fitted between the first rotary component 3 and the second rotary component 2 is a control mechanism, which comprises a cylindrical pin 6, a control base and a control axis; the cylindrical pin 6 and the control base form a rotary connection, and one end of the control axis and the control base form a rotary connection. The cylindrical pin 6 and the second plane 302 of the said first rotary component form a fixed connection, and the other end of the control axis forms a rotary connection with the second rotary component 2. In this preferred embodiment, the other end of the control axis is rotated to drive the control base to rotate, and driven by the control base, the cylindrical pin will further drive the axial rotation of the first rotary component 3 around the rotary axis 4; the control axis is used to control the movement of the said control base and further drive the axial rotation of the first rotary component around the rotary axis.

The said cross slide block 7 is provided with a second through hole 701 and a third through hole 702. The axial directions of the said second through hole 701 and the said third through hole 702 are perpendicular to one another and are not on the same plane; the axial direction of the said second through hole 701 is parallel to that of the said rotary axis 4. The said first rotary component 3 is fitted with a horizontal axial base 5, and both ends of the said horizontal axial base 5 are provided with concentric via holes, that is, a first via hole 501 and a second via hole 502 respectively. The cylindrical pin 6 passes through the first via hole 501, the second through hole 701 and the second via hole 502 in turn to form a rotary connection between the said horizontal axial base 5 and the said cross slide block 7, and the said cross slide block 7 slides on the cylindrical pin 6. In this preferred embodiment, when the cross slide block 7 moves in the axial direction of the third through hole 702, it will drive the second through hole 701 to rotate in the axial direction, which will further drive the cylindrical pin 6 to rotate. As the rotation of the cylindrical pin 6 will cause the horizontal axial base 5 to move, the first rotary component 3 will accordingly rotate, and at this time, the first rotary component 3 will rotate in two axial directions around the rotary axis 4 and the cylindrical pin 6, thereby performing the overall rotation of the first rotary component 3.

The control axis is a crank lever 8, and the said crank lever 8 comprises a crank short axis 801, a crank arm 802 and a crank long axis 803: the said crank short axis 801 and the said crank long axis 803 are connected to both ends of the said crank arm 802 and are both perpendicular to the said crank arm 802, the end of the said crank short axis 801 and that of the said crank long axis 803 are opposite in direction, and the crank short axis is inserted into the third through hole 702. In this preferred embodiment, when the crank long axis 803 rotates, the crank short axis 801 will rotate in the axial direction around the crank long axis 803, and when the crank short axis 801 rotates, it will drive the cross slide block 7 to move on the cylindrical pin 6 and can drive the second through hole 701 of the cross slide block 7 to rotate in the axial direction.

The second rotary component 2 is fitted with a U groove 203: the said cross slide block 7 is arranged in the U groove 203, and rotates in the U groove 203 along the axial direction of the third through hole 702. In this preferred embodiment, the groove takes a U shape so the cross slide block 7 can slide along the inner wall of the U groove 203, when driven by the crank lever 8.

The second rotary component 2 is fitted with a crank axial base 9, the said crank axial base 9 is provided with an axis base hole 901, and the crank long axis 803 passes through the axis base hole 901. In this preferred embodiment, the crank axial base 9 is provided with a bolt via hole and the second rotary component 2 is provided with a corresponding thread hole. The crank axial base 9 is rigidly connected to the second rotary component 2 via a bolt. The crank long axis 803 passes through the axis base hole 901, and can rotate along the axial line of the axis base hole 901 and hold the crank lever 8 in place to prevent it from sliding out of the third through hole 702 during rotation.

In this preferred embodiment, the first rotary component 3 is fitted with a non-fall locking nut 11, the crank axial base 9 of the second rotary component 2 is provided with a corresponding thread hole 902, and the non-fall locking nut 11 is screwed into the thread hole 902 to hold the first rotary component 3 and the crank axial base 9 in place. The first rotary component 3 does not rotate in relation to the second rotary component 2. When an ordinary key without bevel tooth is processed, the non-fall locking nut 11 can be tightened so as to hold the first rotary component 3 and the second rotary component 2 in place. At this time, the first rotary component 3 will not move in relation to the second rotary component 2. The user can move the crank long axis 803 up and down so that the first rotary component 3 and the second rotary component 2 will rotate around the slide base 1, and finally, the first rotary component 121, the second fixed component 122, the original key and the duplicated key will rotate around the slide base 1.

The bottom of the second rotary component 2 is provided with a fourth through hole 201. The said slide base 1 is cylindrical, and the inner diameter of the said fourth through hole 201 is the same as the diameter of the said slide base 1. In this preferred embodiment, the slide base 1 is cylindrical so the second fixed component 2 can slide on the slide base 1, so that the fixed component 12 can freely slide in relation to the bench position. After processing one tooth, the user can slide left and right to align other teeth for processing. This will allow the user only to operate horizontal and axial feeding, increasing convenience and improving continuity. In some other preferred embodiments, the bottom of the second rotary component 2 is fitted with a cylindrical slide block, and one generating line on the outer side of the cylinder is fitted with a connecting sheet. One side of the connecting sheet is rigidly connected to one generating line of the cylinder, the opposite side is connected to the second rotary component 2, and the slide base 1 is a C slide groove. The slide block crosses the outer side of the slide groove so that the slide block is arranged inside the slide groove, and the connecting sheet is positioned in the gap of the slide groove. Thus, the connecting piece can sway in the gap of the slide groove, and further drive the slide block to rotate in the axial direction of the slide block inside the slide groove.

The second rotary component 2 also comprises a handle 10, and the said handle 10 is fitted outside the said crank long axis 803. In this preferred embodiment, the outer side of the handle 10 is furnished with a concave pattern that can increase the frictional force and help rotate the handle 10 to further drive the rotation of the crank long axis 803.

In this preferred embodiment, the key with bevel tooth is processed as follows: loosen the non-fall locking nut 11 to release the first rotary component 3 and the second rotary component 2. Rotate the handle 10 along the axial line of the handle 10 to make the crank lever 8 rotate around the axial line of the crank long axis 803, so that the crank short axis 801 of the crank lever 8 will also rotate along the axial line of the crank long axis 803. The crank short axis 801 crosses the cross slide block 7, and the cross slide block 7 is restricted by two axial lines perpendicular to one another as to the direction of movement. Therefore, driven by the crank lever 8, the cross slide block 7 will finally rotate back and forth in the direction of the crank short axis 801, slide left and right along the axial line of the cylindrical pin 6, and move up and down in the rotary direction of the handle. This will drive the horizontal axial base 5 to rotate up and down around the rotary axis 4 and drive the first rotary component 3 to rotate around the slide base 1, thereby finally causing the first fixed component 121, the second fixed component 122, the original key and the duplicated key to rotate around the slide base 1. To conclude, the user can rotate the handle 10 left and right and pull the handle 10 up and down to make the first fixed component 121, the second fixed component 122, the original key and the duplicated key perform a composite movement, namely, rotate around the slide base 1 and the rotary axis 4, thereby creating a greater angle of contact between the duplicated key and the guide pin sheet and the cutter on the bench.

When using the clamp bench of the key duplicating machine under this solution to process a key, the user can press and rotate the handle 10 with one hand to perform composite rotary feeding of the duplicated key along two different axial lines around the rotary axis 4 and the slide base 1, thereby completing the processing of the key with bevel tooth. At the same time, the feeding along the axial line of the duplicated key can be simultaneously performed, thereby enhancing the stability, convenience and continuity of processing. Moreover, the user can tighten the non-fall locking nut 11 to perform single rotary feeding of the duplicated key in the axial direction in relation to the slide base 1, thereby completing the processing of ordinary keys with straight tooth, ensuring universality.

Figure 4:
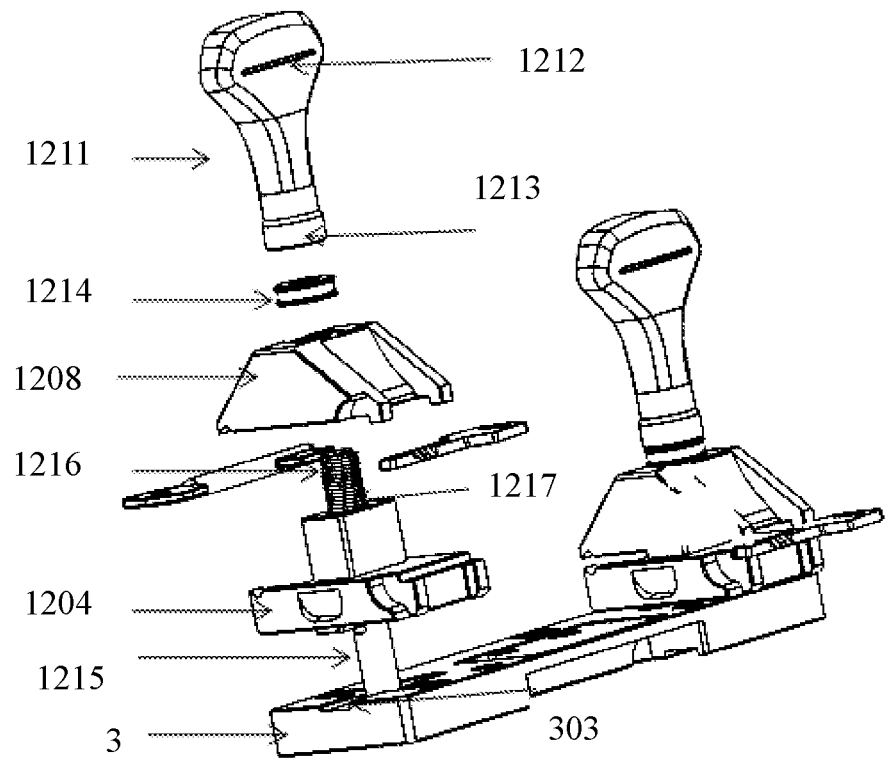
FIG. 4 is the schematic diagram for the structure of the clamping mechanism in a preferred embodiment of the clamp bench for a key duplicating machine under this solution.
Figure 5:
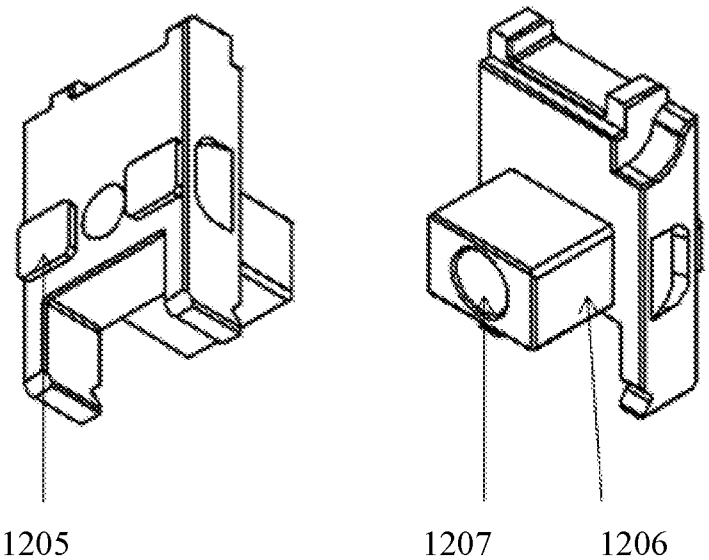
FIG. 5 is the schematic diagram for the structure of the first clamping jaws in a preferred embodiment of the first clamping jaws for a key duplicating machine under this solution.
Figure 6:
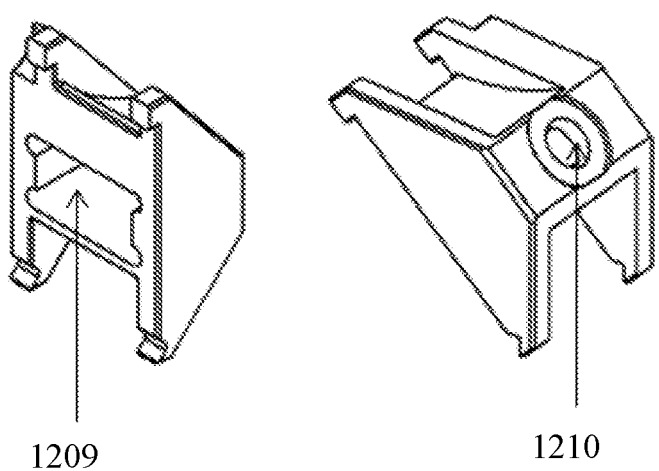
FIG. 6 is the schematic diagram for the structure of the second jaw in a preferred embodiment of the first clamping jaws for a key duplicating machine under this solution.

In the clamp bench for the key duplicating machine under this solution, the fixed component 12 and the first rotary component 3 jointly constitute the clamping mechanism of the key duplicating machine, as shown in FIG. 4 to FIG. 6. Take the structure of the first fixed component 121 for example: the first fixed component 121 comprises a rotary knob 1211, one end of the rotary knob 1211 is the handle structure 1212, and the other end is provided with a thread hole 1213. The clamping mechanism comprises the first rotary component 3 as the base, a spindle 1215, first clamping jaws 1204, a flexible element 1216, second clamping jaws 1208, a thrust bearing 1214 and a rotary knob 1211. The base (the first rotary component 3) is fitted with a first embedding structure 303 and an installation hole. One end of the spindle 1215 is fitted with an inner thread structure, the installation hole crossing the first rotary component 3 is rigidly connected to the first rotary component 3 via thread connection, and the other end of the spindle 1215 is fitted with an external thread structure 1217. The two sides of the first clamping jaws 1204 are fitted with a second embedding structure 1205 and a third embedding structure 1206 respectively. The third embedding structure 1206 is fitted with a counterbore 1207; the spindle 1215 crosses the counterbore

1207. The second embedding structure 1205 is embedded with the first embedding structure 303, the second clamping jaws 1208 are provided with a through hole 1209 and a fourth embedding structure 1210, the second clamping jaws 1208 cross the spindle 1215 via the through hole 1209, and the fourth embedding structure 1210 is embedded with the third embedding structure 1206. The flexible element 1216 is arranged around the spindle 1215, the lower end of the flexible element 1216 pushes against the counterbore 1207 of the first clamping jaws 1204, and the upper end of the flexible element pushes against the through hole 1209 of the second clamping jaws 1208. The thrust bearing 1214 is arranged around the spindle 1215, the bottom of the thrust bearing 1214 pushes against the second clamping jaws 1208, and the top pushes against the rotary knob 1211. One end of the rotary knob 1211 is the handle structure 1212, the other end is provided with the thread hole 1213, and the rotary knob 1211 forms a thread connection with the external thread structure 1217 of the spindle 1215 through the thread hole 1213.

In a specific implementation, the first embedding structure 303 is a cross groove, and the installation hole is a round through hole. The counterbore 1207 is opposite to the through hole 1209. The second embedding structure 1205 and the third embedding structure 1206 are both square concave blocks. The fourth embedding structure 1210 is a square groove. The flexible element 1216 is a return spring with a restoring force that will keep the first clamping jaws 1204 and the second clamping jaws 1208 away from one another.

In particular, when the key is clamped for duplication, the user will put the key on the first clamping jaws 1204, then rotate the rotary knob 1211 with the handle structure 1212; when the rotary knob 1211 rotates, the rotary knob 1211 will move downward as a result of the joint action between the internal thread of the thread hole 1213 and the external thread structure 1217 of the spindle 1215, to press down the second clamping jaws 1208 until they and the first clamping jaws 1204 clamp the key. At this time, the fourth embedding structure 1210 and the third embedding structure 1206 will embed to limit the clamping jaws and make them clamp the key even more firmly. The thrust bearing 1214 is arranged between the rotary knob 1211 and the second clamping jaws 1208; the thrust bearing 1214 is composed of a ball part, an upper cover and a lower cover. The rotation of the rotary knob 1211 is actually a rolling friction between the upper cover of the thrust bearing 1214 and the balls, as well as between the lower cover and the balls, to replace the sliding friction between the rotary knob 1211 and the second clamping jaws 1208, thereby reducing the frictional force and preventing the wearing of the rotary knob 1211 and the second clamping jaws 1208. After completing the key duplication, the user can rotate the rotary knob 1211 in the opposite direction to move upward, and the second clamping jaws 1208 will also be reset due to the restoring force of the flexible element 1216.

The clamping mechanism in the clamp bench for the key duplicating machine under this solution uses the directional embedding body as the guiding embedding mechanism between the first clamping jaws and the second clamping jaws. This has the benefits of higher precision, more stable operation, a simple structure and a high level of machining and assembly efficiency. At the same time, the mechanism adds a thrust bearing device, uses the thrust bearing to replace the cushion, and employs the rolling friction between the upper cover of the thrust bearing and the balls, as well as the lower cover and the balls, to replace the sliding friction between the rotary knob and the cushion or between the rotary knob and the second clamping jaws. Compared to the current technologies, the mechanism delivers good operating performance, causes no abrasion of parts and involves no need to replace components, thereby achieving higher operating performance.

The specific implementation methods of this solution provides a key duplicating machine, which includes the clamp bench under this disclosure.

In another implementation method, this solution provides a key duplicating machine, which includes the clamp bench under this disclosure and a guiding base mechanism.

Figure 7:
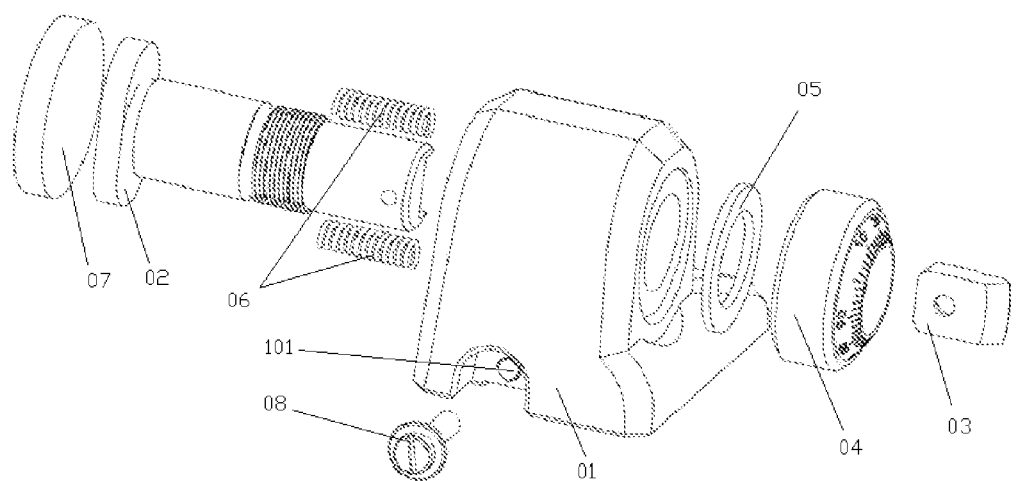
FIG. 7 is the exploded-view schematic diagram for the structure of the slide base mechanism in a preferred embodiment of the clamp bench for a key duplicating machine under this solution.
Figure 8:
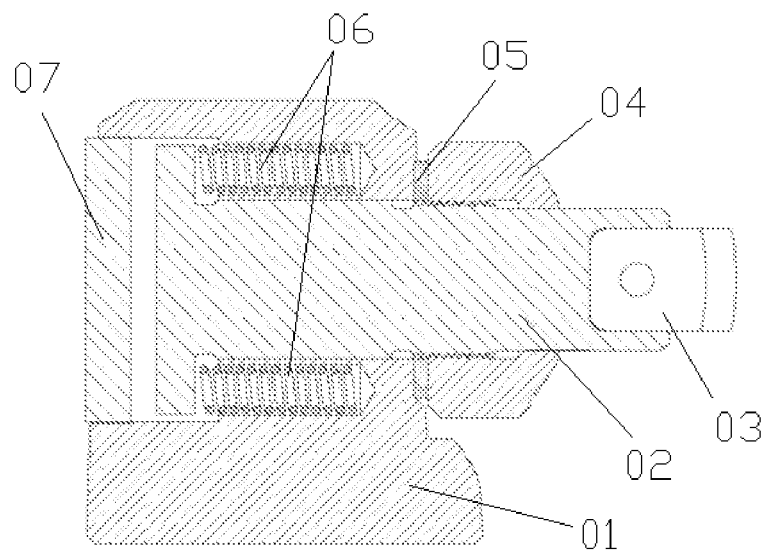
FIG. 8 is the schematic diagram for the sectional structure of the slide base mechanism in a preferred embodiment of the clamp bench for a key duplicating machine under this solution.

In a specific implementation, as demonstrated in FIG. 7 and FIG. 8, the guide base mechanism of the key duplicating machine comprises a guide base foundation 01, a guide base axis 02, a milling cutter guide sheet 03, a regulating nut 04, a cushion 05, a flexible element 06, an end cover 07 and a horizontal regulating bolt 08. The guide base foundation 01 is provided with a centre hole; inside the centre hole is the guide base axis 02. The milling cutter guide sheet 03 is rigidly connected to the head part of the guide base axis 02 via a thread fastener. The middle part of the guide base axis is fitted with an external thread. The regulating nut 04 is fitted with an internal thread that matches the external thread, and is fastened on the guide base axis 02 via the thread. The cushion 05 is arranged around the guide base axis 02 and fixed between the front-end surface of the guide base foundation 01 and the regulating nut 04. The flexible element 06 is arranged between the guide base foundation 01 and the guide base axis 02. The end cover 07 is installed in the hole tail part of the guide base foundation 01 via a thread fastener and attached to the guide base foundation 01. The horizontal function of the guide base foundation 01 is provided with a thread hole 101, and the regulating nut 08 is installed on the thread hole 101. The horizontal regulating bolt 08 is fitted with a round sheet, which is embedded in the groove at the base of the key duplicating machine.

In a specific implementation, the tail of the guide base axis 02 is a waist-like round concave platform, and inside the guide base foundation 01 is a waist-like stair hole that matches the platform. The cushion 05 is made of copper or an abrasion-resistant plastic material, and the external surface of the regulating nut 04 is carved with scales. The guide base axis 02 passes through the centre hole and is installed on the guide base foundation 01. The horizontal regulating bolt 08 is thread connected to the thread hole 101. There are two flexible elements 06.

In the guide base mechanism for the key duplicating machine under this solution, the tail of the guide base axis 02 is a waist-like round concave platform. Inside the guide base foundation 01 is a waist-like stair hole that matches the platform: this structure will prevent the guide base axis 02 from rotating in the guide base foundation 01 and allow it only to slide along the axial line. The milling cutter guide sheet 03 is attached to the head part of the guide base axis 02 via thread fastener and other means. The middle part of the guide base axis 02 is fitted with an external thread. The regulating nut 04 is fitted with an internal thread that matches it and is fitted on the guide base axis 02 via thread. The cushion 05 is arranged around the guide base axis 02 and between the front-end surface of the guide base foundation 01 and the regulating nut 04 to reduce the frictional force during the rotation of the regulating nut 04, and the cushion 05 is made of copper or an abrasion-resistant plastic material. The external surface of the regulating nut 04 is carved with scales, which are calculated with the screw pitches of the regulating nut 04 and used to indicate the relationship between the rotary angle and the movement distance of the guide base axis 02. The flexible element 06 is arranged between the guide base foundation 01 and the guide base axis 02 to make the regulating nut 04. The cushion 05 and the guide base foundation 01 always maintain contact with one another. The end cover 07 is installed in the hole tail part of the guide base foundation 01 via thread fastener and other means, and is attached to the guide base foundation 01 to serve as a seal and axial limiter. The horizontal direction of the guide base foundation 01 is provided with a thread hole 101, and the horizontal regulating bolt 08 is installed on the thread hole 101. The horizontal regulating bolt 08 is fitted with a round sheet, which is embedded in the groove at the base of the key duplicating machine. By rotating the horizontal regulating bolt 08 of the guide base, the user can tune the horizontal direction of the guide base foundation 01 and adjust the horizontal space between the milling cutter guide sheet 03 and the milling cut.

For certain tasks, the user can rotate the regulating nut 04 to make the milling cutter guide sheet 03 of the key duplicating machine retract backward or stretch forward, adjust the locational relationship between the front direction and back direction of the milling cutter and ensure they are aligned. By rotating the horizontal regulating bolt 08 of the guide base, the user can tune the horizontal direction of the guide base foundation 01 and adjust the horizontal space between the milling cutter guide sheet 03 and the milling cut, to ensure consistent positions between them and the key. This structure is simple and reliable. The nut is arranged at the front end, thereby becoming more convenient and visible. By adopting such a guide base mechanism, the key duplicating machine can better adjust the relative position of the milling cutter, simplify the operation and further increase the processing precision.

The above description of the preferred embodiment of the key duplicating machine does not limit the scope of protection of the present solution. Any equivalent structure or equivalent flow with this specification and contents of the attached drawings, or direct or indirect use of the same in other related technical fields shall fall under the scope of patent protection of the present solution by the same token.

While the present disclosure has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the disclosure.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A clamp bench for key duplicating machines comprising:
    a fixed component,
    a first rotary component,
    a second rotary component and a slide base, wherein the fixed component comprises a first fixed component and a second fixed component, the first fixed component is used to hold a master key in place and the second fixed component is used to hold a key blank in place, wherein
    the first rotary component, the first fixed component and the second fixed component are rigidly connected to a first plane of the first rotary component, the second rotary component forms a rotary connection with a second plane of the first rotary component, and the second plane and the first plane are opposite to one another, wherein
    the first rotary component rotates in an axial direction around a connecting point with the second rotary component, the slide base forms a rotary connection with the second rotary component, the second rotary component rotates in the axial direction around the connecting point with the slide base, wherein
    the axial direction in which the second rotary component rotates is the same as that of the first rotary component, and the second rotary component slides along the slide base, wherein the second plane of the first rotary component is fitted with a rotary axis, wherein fitted between the first rotary component and the second rotary component is a control mechanism, wherein
    the control mechanism comprises a cylindrical pin, a control base and a control axis, wherein the cylindrical pin and the control base form a rotary connection, one end of the control axis and the control base form a rotary connection, and wherein
    the cylindrical pin and the second plane of the first rotary component form a fixed connection, an other end of the control axis forms a rotary connection with the second rotary component;
    the control axis is used to control a movement of the control base and further drive an axial rotation of the first rotary component around the rotary axis.

2. The clamp bench for key duplicating machines according to claim 1, wherein the first fixed component and the second fixed component comprise an upper clamp, a lower clamp and a locking mechanism respectively, the upper clamp and the lower clamp are opposite to one another, the lower clamp is rigidly connected to the first plane of the first rotary component, the locking mechanism is rigidly connected to the upper clamp and the lower clamp, wherein the locking mechanism is used to control an opening and closing of the upper clamp and the lower clamp.

3. The clamp bench for key duplicating machines according to claim 1, wherein the first rotary component rotates in the axial direction around the rotary axis, wherein the second rotary component is provided with a first through hole, with an inner diameter which is the same as a diameter of the rotary axis and the rotary axis passes through the first through hole and rotates inside it.

4. The clamp bench for key duplicating machines according to claim 3, wherein the second rotary component is fitted with a U groove, the cross slide block is arranged in the U groove and rotates in the U groove along an axial direction of the third through hole.

5. The clamp bench for key duplicating machines according to claim 3, wherein the second rotary component is fitted with a crank axial base, the crank axial base is provided with an axis base hole and the crank long axis passes through the axis base hole.

6. The clamp bench for key duplicating machines according to claim 1, wherein the control base is a cross slide block which is provided with a second through hole and a third through hole, wherein axial directions of the second through hole and the third through hole are perpendicular to one another and are not on a same plane, wherein the axial direction of the second through hole is parallel to that of the rotary axis, wherein the first rotary component is fitted with a horizontal axial base, and both ends of the horizontal axial base are provided with concentric via holes, that is, a first via hole and a second via hole respectively, wherein the cylindrical pin passes through the first via hole, the second through hole and the second via hole in turn to form a rotary connection between the horizontal axial base and the cross slide block, and the cross slide block slides on the cylindrical pin.

7. The clamp bench for key duplicating machines according to claim 1, wherein the control axis is a crank lever comprising a crank short axis, a crank arm and a crank long axis, wherein the crank short axis and the crank long axis are connected to both ends of the crank arm and are both perpendicular to the crank arm, an end of the crank short axis and that of the crank long axis are opposite in direction and the crank short axis is inserted into the third through hole.

8. The clamp bench for key duplicating machines according to claim 1, wherein the fixed component and the first rotary component jointly constitute a clamping mechanism and the clamping mechanism comprises the first rotary component as the base, a spindle, a first clamping jaws, a flexible element, a second clamping jaws, a thrust bearing and a rotary knob, wherein the first rotary component is fitted with a first embedding structure and an installation hole, wherein the installation hole crossing the first rotary component is rigidly connected to the first rotary component via thread connection, and wherein an end of the spindle is fitted with an external thread structure.

9. The clamp bench for key duplicating machines according to claim 8, wherein two sides of the first clamping jaws are fitted with a second embedding structure and a third embedding structure respectively, the third embedding structure is fitted with a counterbore, the spindle crosses the counterbore, the second embedding structure is embedded with the first embedding structure, the second clamping jaws are provided with a through hole and a fourth embedding structure, the second clamping jaws cross the spindle via the through hole, and the fourth embedding structure is embedded with the third embedding structure, wherein the flexible element is arranged around the spindle, a lower end of the flexible element pushes against the counterbore of the first clamping jaws, an upper end of the flexible element pushes against the through hole of the second clamping jaws, the thrust bearing is arranged around the spindle, a bottom of the thrust bearing pushes against the second clamping jaws, a of the thrust bearing pushes against the rotary knob, one end of the rotary knob is a handle structure, the another end of the rotary knob is provided with a thread hole, and the rotary knob forms a thread connection with the external thread structure of the spindle through the thread hole.

10. The clamp bench for key duplicating machines according to claim 9, wherein the first embedding structure is a cross groove, the counterbore is opposite to the thread hole, wherein the second embedding structure and the third embedding structure are both square concave blocks, and wherein the fourth embedding structure is a square groove and the flexible element is a return spring with a restoring force that will keep the first clamping jaws and the second clamping jaws away from one another.

11. A key duplicating machine according to claim 1, wherein the key duplicating machine comprises the clamp bench.

12. The key duplicating machine according to claim 11, wherein the machine also comprises a guiding base mechanism, wherein the guide base mechanism comprises a guide base foundation, a guide base axis, a milling cutter guide sheet, a regulating nut, a cushion, a flexible element, an end cover and a horizontal regulating bolt, wherein the guide base foundation is provided with a centre hole, wherein inside the centre hole is the guide base axis, wherein the milling cutter guide sheet is rigidly connected to a head part of the guide base axis via a thread fastener, wherein a middle part of the guide base axis is fitted with an external thread, the regulating nut is fitted with an internal thread that matches the external thread, and is fastened on the guide base axis via the thread, wherein the cushion is arranged around the guide base axis and fixed between a front-end surface of the guide base foundation and the regulating nut, the flexible element is arranged between the guide base foundation and the guide base axis, the end cover is installed in a hole tail part of the guide base foundation via a thread fastener and attached to the guide base foundation, a horizontal function of the guide base foundation is provided with a thread hole, and the regulating nut is installed on the thread hole, the horizontal regulating bolt is fitted with a round sheet embedded in a groove at the base of the key duplicating machine.

13. The key duplicating machine according to claim 12, wherein a tail of a guide base axis is a round concave platform, and inside the guide base foundation is a stair hole that matches the platform.

14. The key duplicating machine according to claim 12, wherein a cushion is made of copper or an abrasion-resistant plastic material and an external surface of the regulating nut is carved with scales.

* * * * *